US010375883B2

(12) United States Patent
Zerbarini et al.

(10) Patent No.: US 10,375,883 B2
(45) Date of Patent: Aug. 13, 2019

(54) HORIZONTAL ROTARY TRIMMER WITH VENTED BAFFLE

(71) Applicant: HRM Enterprises, Inc., Westerly, RI (US)

(72) Inventors: Richard Zerbarini, Westerly, RI (US); Robert Zerbarini, Westerly, RI (US); Paul Zerbarini, Westerly, RI (US)

(73) Assignee: HRM Enterprises, Inc., Westerly, RI (US)

( * ) Notice: Subject to any disclaimer, the term of this patent is extended or adjusted under 35 U.S.C. 154(b) by 5 days.

(21) Appl. No.: 15/634,804

(22) Filed: Jun. 27, 2017

(65) Prior Publication Data
US 2017/0290262 A1  Oct. 12, 2017

Related U.S. Application Data

(63) Continuation-in-part of application No. 15/350,909, filed on Nov. 14, 2016, now Pat. No. 9,907,226,
(Continued)

(51) Int. Cl.
A01D 34/90 (2006.01)
A01G 3/053 (2006.01)
A01G 3/06 (2006.01)
A01D 34/84 (2006.01)
A01D 34/46 (2006.01)
(Continued)

(52) U.S. Cl.
CPC ............. A01D 34/90 (2013.01); A01D 34/46 (2013.01); A01D 34/47 (2013.01); A01D 34/49 (2013.01); A01D 34/52 (2013.01);

A01D 34/54 (2013.01); A01D 34/84 (2013.01); A01G 3/0535 (2013.01); A01G 3/062 (2013.01)

(58) Field of Classification Search
CPC ........ A01D 34/90; A01D 34/47; A01D 34/54; A01D 34/49; A01D 34/52; A01D 34/46; A01D 34/84; A01G 3/0535; A01G 3/062
See application file for complete search history.

(56) References Cited

U.S. PATENT DOCUMENTS 1,669,471 A     5/1928  Jones
2,505,576 A  *  4/1950  Reitan ................. A01D 76/003
                                                        125/3
(Continued)

FOREIGN PATENT DOCUMENTS

GB   2518594 A  *  4/2015  .......... A01G 3/0535
JP   20151616 A  *  6/2015

OTHER PUBLICATIONS

EP Extended Search Report dated Aug. 22, 2016 for European Patent Application No. 14751785.8.
(Continued)

Primary Examiner — Arpad Fabian-Kovacs
(74) Attorney, Agent, or Firm — Suiter Swantz pc llo

(57) ABSTRACT

A lawn mower includes a housing with a baffle that defines an air path to produce a cross-flow. The baffle includes a vent to manipulate air pressures within the housing and facilitate movement of plant clippings. A hand-held device for trimming with a rotary blade assembly may also include a housing that defines an air path to produce a cross-flow. The hand-held trimming device may also a baffle with a vent to facilitate movement of plant clippings.

16 Claims, 14 Drawing Sheets

Related U.S. Application Data which is a continuation-in-part of application No. 14/524,860, filed on Oct. 27, 2014, now Pat. No. 9,491,905, which is a continuation of application No. 13/768,856, filed on Feb. 15, 2013, now Pat. No. 9,538,704, and a continuation of application No. PCT/US2014/016319, filed on Feb. 13, 2014.

(60) Provisional application No. 61/895,859, filed on Oct. 25, 2013.

(51) Int. Cl.
*A01D 34/52* (2006.01)
*A01D 34/47* (2006.01)
*A01D 34/49* (2006.01)
*A01D 34/54* (2006.01)

(56) References Cited

U.S. PATENT DOCUMENTS

| | | | |
|---|---|---|---|
| 2,656,662 A | 10/1953 | Hines | |
| 2,734,328 A | 2/1956 | Wood | |
| 2,947,129 A | 8/1960 | Kowalik | |
| 2,999,346 A | 9/1961 | Mathews | |
| 3,191,371 A | 6/1965 | Brewer | |
| 3,210,918 A | 10/1965 | Van Der Lely | |
| 3,641,754 A | 2/1972 | Anstee | |
| 3,659,385 A | 5/1972 | Ferguson | |
| 3,673,773 A | 7/1972 | Ferguson | |
| 3,729,143 A | 4/1973 | Wagstaff et al. | |
| 3,783,592 A | 1/1974 | Schraut | |
| 3,811,255 A | 5/1974 | Ferguson | |
| 3,866,396 A | 2/1975 | Meyer | |
| 3,872,539 A * | 3/1975 | Doyel | A47L 5/26 15/344 |
| 3,875,729 A * | 4/1975 | Partsch | A01D 34/49 56/192 |
| 3,896,609 A | 7/1975 | Overesch | |
| 3,935,695 A | 2/1976 | Merry | |
| 3,998,034 A | 12/1976 | Rubin | |
| 4,109,447 A | 8/1978 | Ferguson | |
| 4,127,980 A | 12/1978 | Ferguson | |
| 4,158,945 A | 6/1979 | Burke | |
| 4,250,695 A * | 2/1981 | Comer | A01G 20/43 56/12.7 |
| 4,320,617 A | 3/1982 | Fedeli | |
| 4,325,195 A * | 4/1982 | Comer | E01H 5/045 37/227 |
| 4,397,059 A * | 8/1983 | Chernosky | A01D 42/06 15/328 |
| 4,422,211 A * | 11/1983 | Chernosky | A01D 42/06 15/328 |
| 4,502,271 A * | 3/1985 | Hansen | A01D 34/66 56/13.6 |
| 4,715,123 A * | 12/1987 | John | A01G 3/0535 30/276 |
| 4,823,542 A | 4/1989 | Klever et al. | |
| 4,905,460 A | 3/1990 | Toman | |
| 5,018,239 A * | 5/1991 | Dobric | A01D 34/001 15/328 |
| 5,063,731 A | 11/1991 | Hull et al. | |
| 5,375,399 A | 12/1994 | Kraft | |
| 5,423,126 A * | 6/1995 | Byrne | A01D 34/416 30/276 |
| 5,467,586 A | 11/1995 | Lin et al. | |
| 5,477,666 A | 12/1995 | Cotton | |
| 5,485,718 A | 1/1996 | Dallman | |
| 5,566,534 A * | 10/1996 | Fassauer | A01D 34/695 56/12.8 |
| 5,577,375 A | 11/1996 | Tillison, Sr. | |
| 5,806,293 A | 9/1998 | Klein et al. | |
| 5,899,052 A | 5/1999 | Turner | |
| 6,026,635 A | 2/2000 | Staiger | |
| 6,082,086 A * | 7/2000 | Togoshi | A01D 34/49 56/199 |
| 6,085,508 A | 7/2000 | Miatt et al. | |
| 6,182,430 B1 | 2/2001 | Blarek et al. | |
| 6,321,518 B1 | 11/2001 | O'Hagan | |
| 6,370,855 B1 | 4/2002 | Evans et al. | |
| 6,658,833 B2 * | 12/2003 | Dunning | A47L 9/1608 56/202 |
| 7,070,005 B2 | 7/2006 | Maas et al. | |
| 7,096,968 B2 | 8/2006 | Maas et al. | |
| 7,669,666 B2 | 3/2010 | Maas et al. | |
| 7,677,021 B2 | 3/2010 | Mahan et al. | |
| 8,316,550 B2 | 11/2012 | Howells | |
| 10,064,342 B1 * | 9/2018 | Parvez | A01G 3/0535 |
| 2002/0113152 A1 * | 9/2002 | Dunning | A47L 9/1608 241/55 |
| 2002/0156556 A1 | 10/2002 | Ruffner | |
| 2003/0061793 A1 | 4/2003 | Wetzel | |
| 2004/0172931 A1 * | 9/2004 | Kolb | A01D 34/52 56/249 |
| 2007/0277404 A1 | 12/2007 | Lun | |
| 2011/0239614 A1 * | 10/2011 | Chou | A01D 34/475 56/249 |
| 2013/0074376 A1 | 3/2013 | Hishida | |
| 2014/0182256 A1 | 7/2014 | Fischier et al. | |
| 2016/0212937 A1 * | 7/2016 | Walden | A01D 43/077 |

OTHER PUBLICATIONS

AU Office Action dated Dec. 20, 2016 for Australian Patent Application No. 2014216266.

EP Office Action dated Jul. 6, 2017 for European Patent Application No. 14751785.8.

* cited by examiner

HORIZONTAL ROTARY TRIMMER WITH VENTED BAFFLE

PRIORITY

The present application is a continuation-in-part of U.S. patent application Ser. No. 15/350,909, filed Nov. 14, 2016, which is a continuation-in-part of U.S. patent application Ser. No. 14/524,860, filed Oct. 27, 2014, now U.S. Pat. No. 9,491,905, which was a non-provisional of U.S. Provisional Patent App. No. 61/895,859 filed on Oct. 25, 2013; and which also claimed priority to U.S. patent application Pub. Ser. No. 13/768,856, filed Feb. 15, 2013, and Patent Cooperation Treaty patent application PCT/US14/16319, filed on Feb. 13, 2014; all of which are incorporated herein in their entirety.

FIELD OF THE INVENTION

The present Invention is directed generally toward mowers and more particularly to hand-held trimming devices.

BACKGROUND

Lawnmowers traditionally come in two varieties: rotary mowers, where blades rotate horizontally in a plane; and reel mowers, where helical blades rotate about an axis so that the helical blades can shear grass against a bedknife.

Trimming devices generally cannot utilize existing mower designs because helical mowers operate with very tight tolerances and rotary mowers and too heavy and cannot spin fast enough to produce an adequate tip speed in a compact form.

Consequently, it would be advantageous if an apparatus existed that is suitable for trimming with a horizontal rotary blade assembly.

SUMMARY

In one aspect, embodiments of the inventive concepts disclosed herein are directed to a hand-held device for trimming with a rotary blade assembly and a housing that defines an air path to produce a cross-flow.

In a further aspect, part of the housing defines a vent to further define the cross-flow and facilitate movement of plant clippings.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
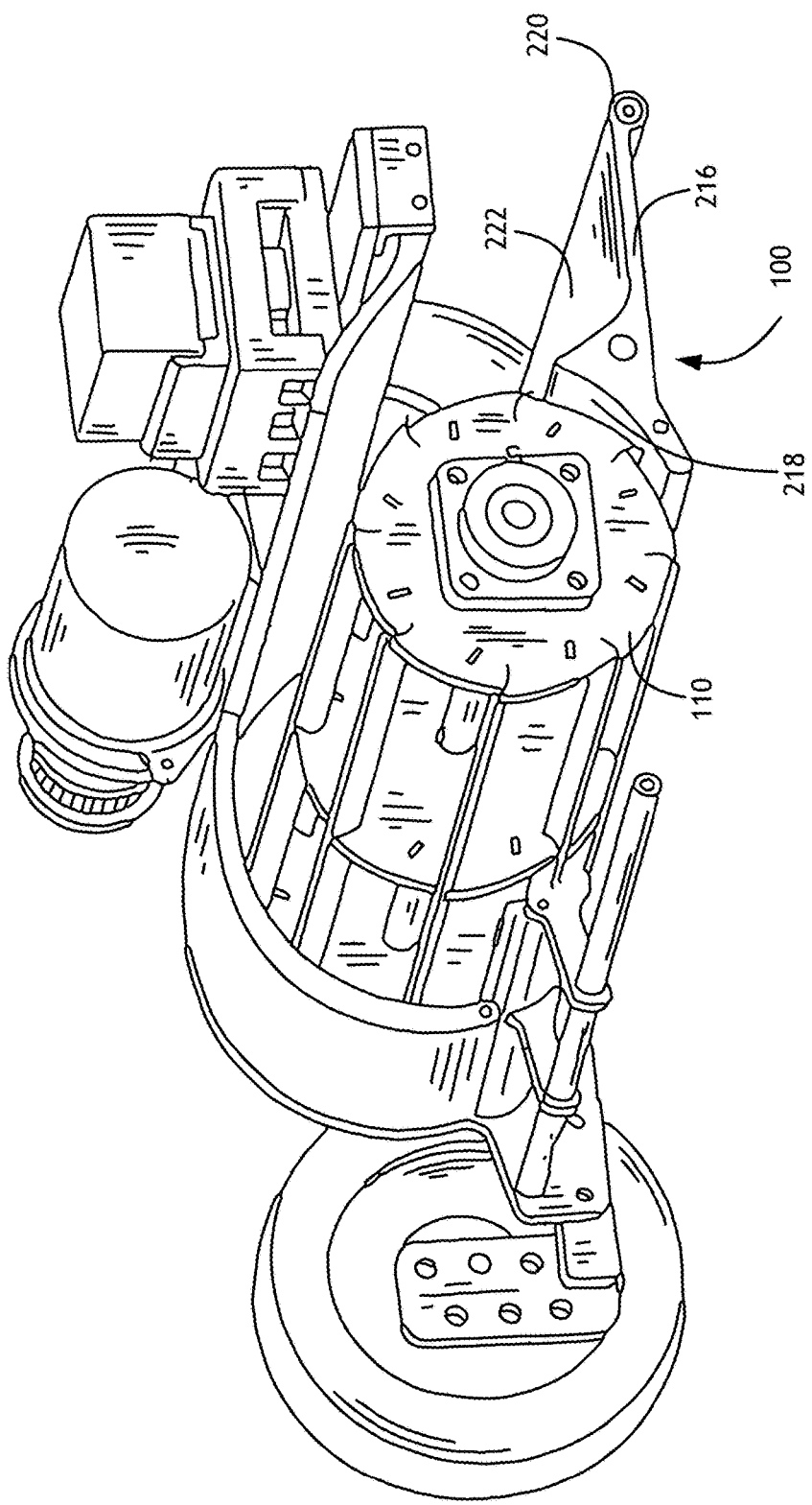
FIG. 1 shows a perspective, partially exploded view of the push type lawnmower, having a blade assembly according to at least one embodiment of the present invention.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a lawn mower with a housing having a baffle that defines an air path to produce a cross-flow. The baffle includes a vent to manipulate air pressures within the housing and facilitate movement of plant clippings. A hand-held device for trimming with a rotary blade assembly may also include a housing that defines an air path to produce a cross-flow. The hand-held trimming device may also include a baffle with a vent to facilitate movement of plant clippings.

Referring to FIG. 1, a perspective, partially exploded view of the push type lawnmower, having a blade assembly and baffle 216 according to at least one embodiment of the present invention is shown. The horizontal rotary mower blade assembly may include a rotary drive shaft. The rotary drive shaft connected to a rotor or a plurality of rotors. The rotors provide attachment surfaces for a plurality of blades such that the cutting edge of the blade faces the direction of rotation of the horizontal blade assembly when the blade assembly is in operation.

The baffle 216 may define the rear bottom part of the cross-flow mower housing. The baffle 216 divides an opening for the intake air and an opening for the exhaust air. The baffle 216 extends across the back side of the housing. The baffle 216 has an air flow control, front surface 218 herein periodically referred to as the tongue or tongue surface. The baffle 216 has bottom surface 100 and a tongue discharge baffle guide 222. In one embodiment of the present invention the tongue discharge baffle guide 222 guides or directs the cut grass clippings from the blade assembly. In some embodiments, a tongue foot guard 220 protects the mower operator.

The baffle 216 combined with a blade assembly housing, defines an area around the blade assembly configured to produce a cross-flow that transits grass clippings from the blade assembly across the tongue discharge baffle guide 222.

While the baffle 216 illustrated in FIG. 1 is depicted in a horizontal rotary mower, baffles 216 as described herein may be useful in other rotary trimming devices that rely on cross-flow. Furthermore, a baffle 216 as described herein may have applications in other devices that utilize fluid dynamic properties, and require pressure normalization between otherwise segregated regions.

Figure 2A:
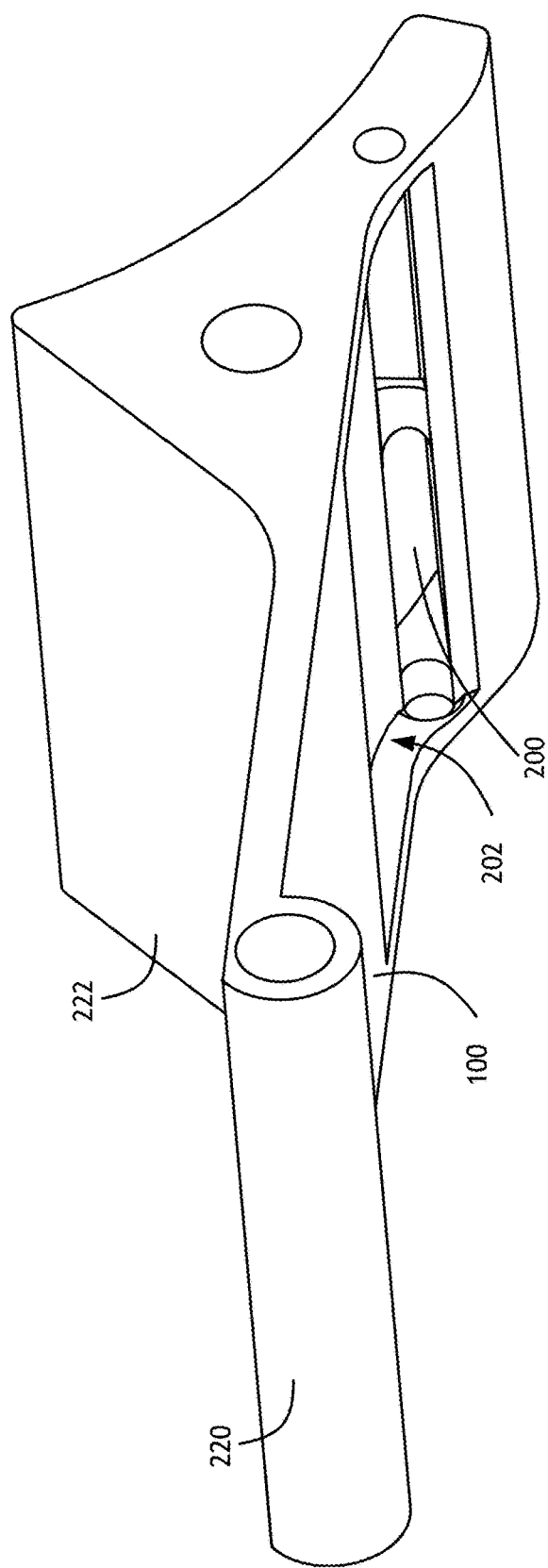
FIG. 2A shows a perspective view of a baffle useful for a horizontal rotary blade assembly according to at least one embodiment of the present invention.
Figure 2B:
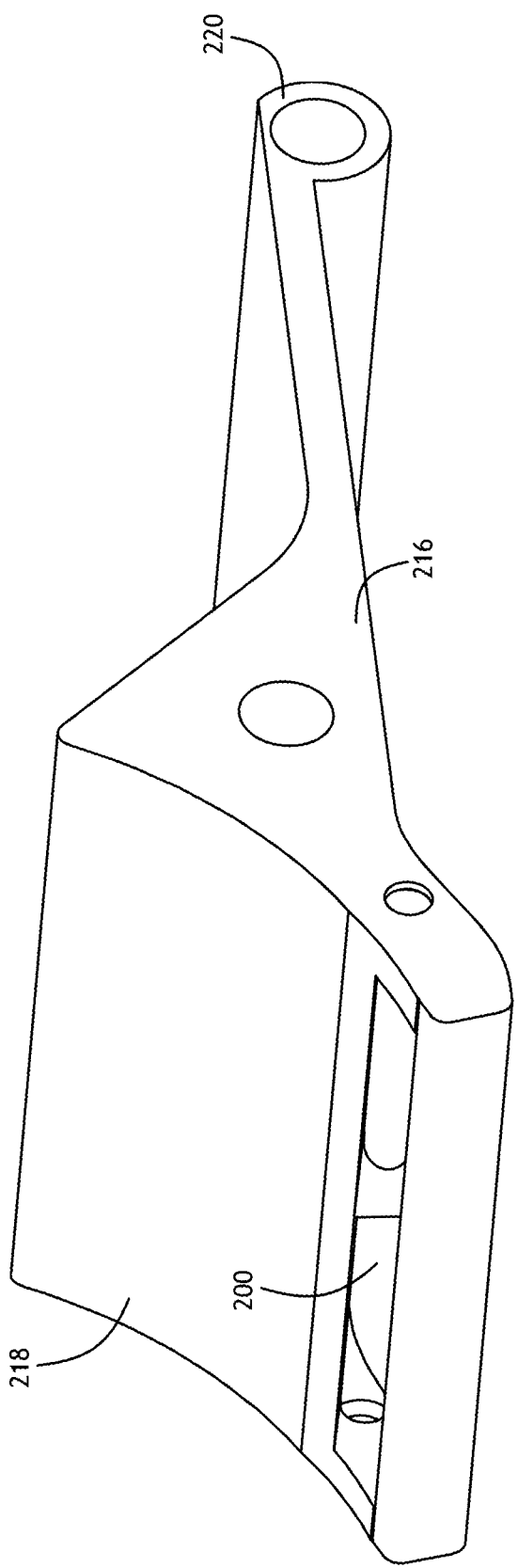
FIG. 2B shows another perspective view of the baffle in 2A.

Referring to FIGS. 2A-2B, perspective views of a baffle 216 useful for a horizontal rotary blade assembly according to at least one embodiment of the present invention are shown. The baffle 216 defines a tongue surface 218 proximal to a blade assembly, a tongue discharge baffle guide 222, and a bottom surface 100 generally oriented to a surface being trimmed.

In some embodiments, the baffle 216 defines a vent 200. The vent 200 connects a region defined by the tongue surface 218 to a region beneath the mower or trimming device as defined by the bottom surface 100. In some embodiments, the baffle 216 may further define a recess 202 in the bottom surface 100. The recess 202 and vent 200 may operate to normalize pressure between the region defined by the tongue surface 218 and the region beneath the mower or trimming device, and thereby facilitate transit of grass or other plant clippings.

Figure 3:
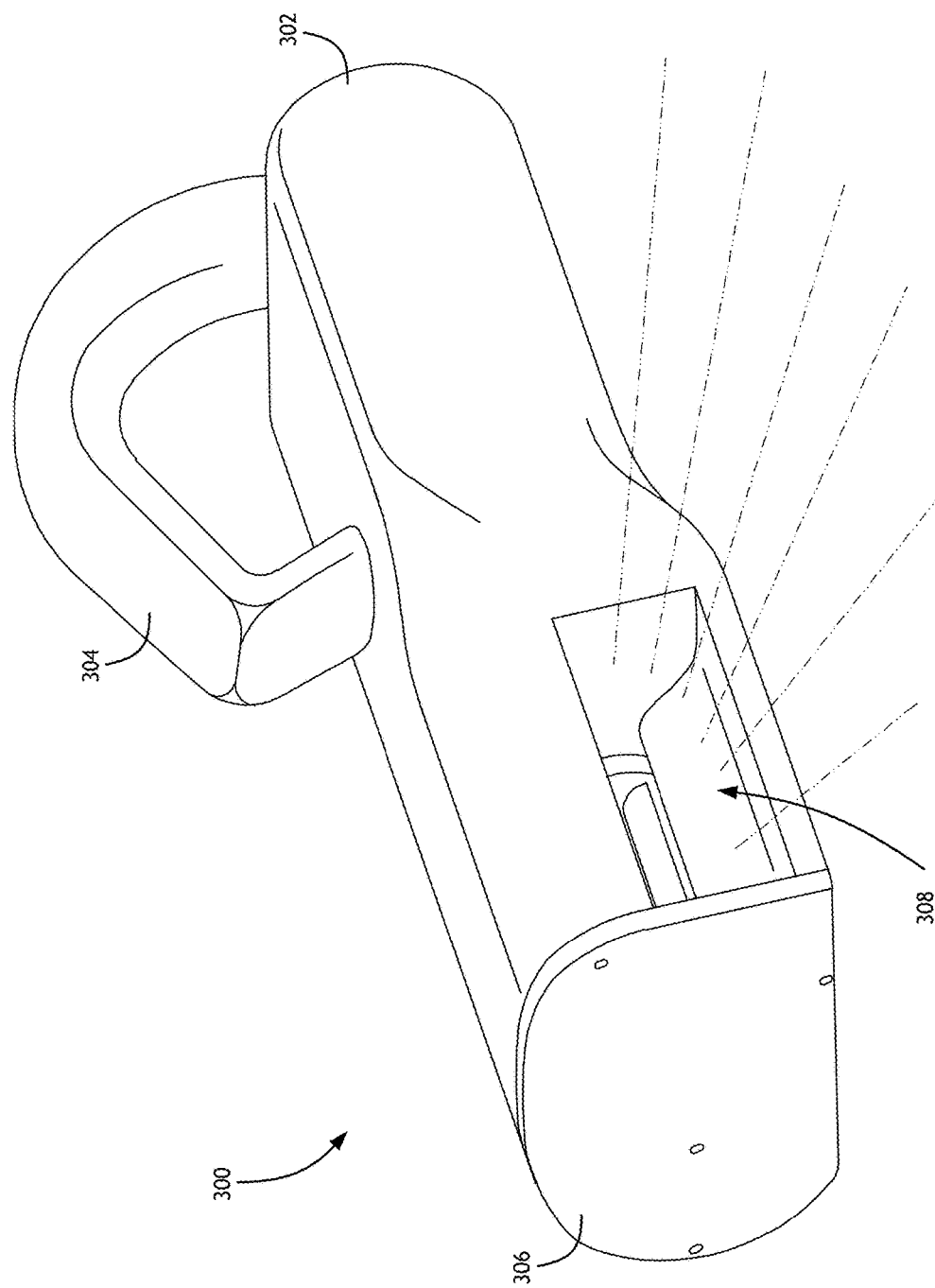
FIG. 3 shows a perspective view of a hand-held trimmer device according to at least one embodiment of the present invention.
Figure 4:
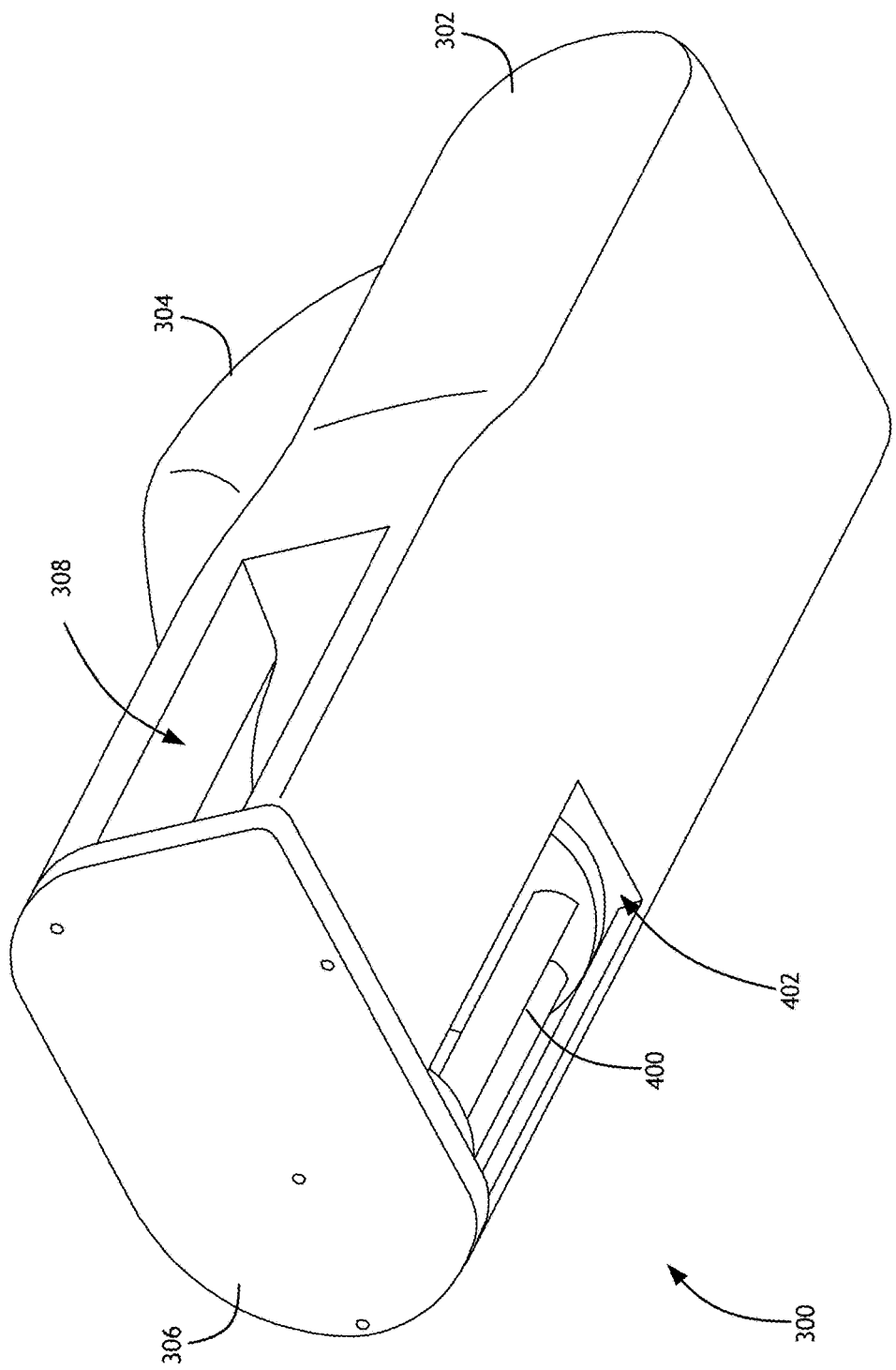
FIG. 4 shows a perspective view of a hand-held trimmer device according to at least one embodiment of the present invention.
Figure 5:
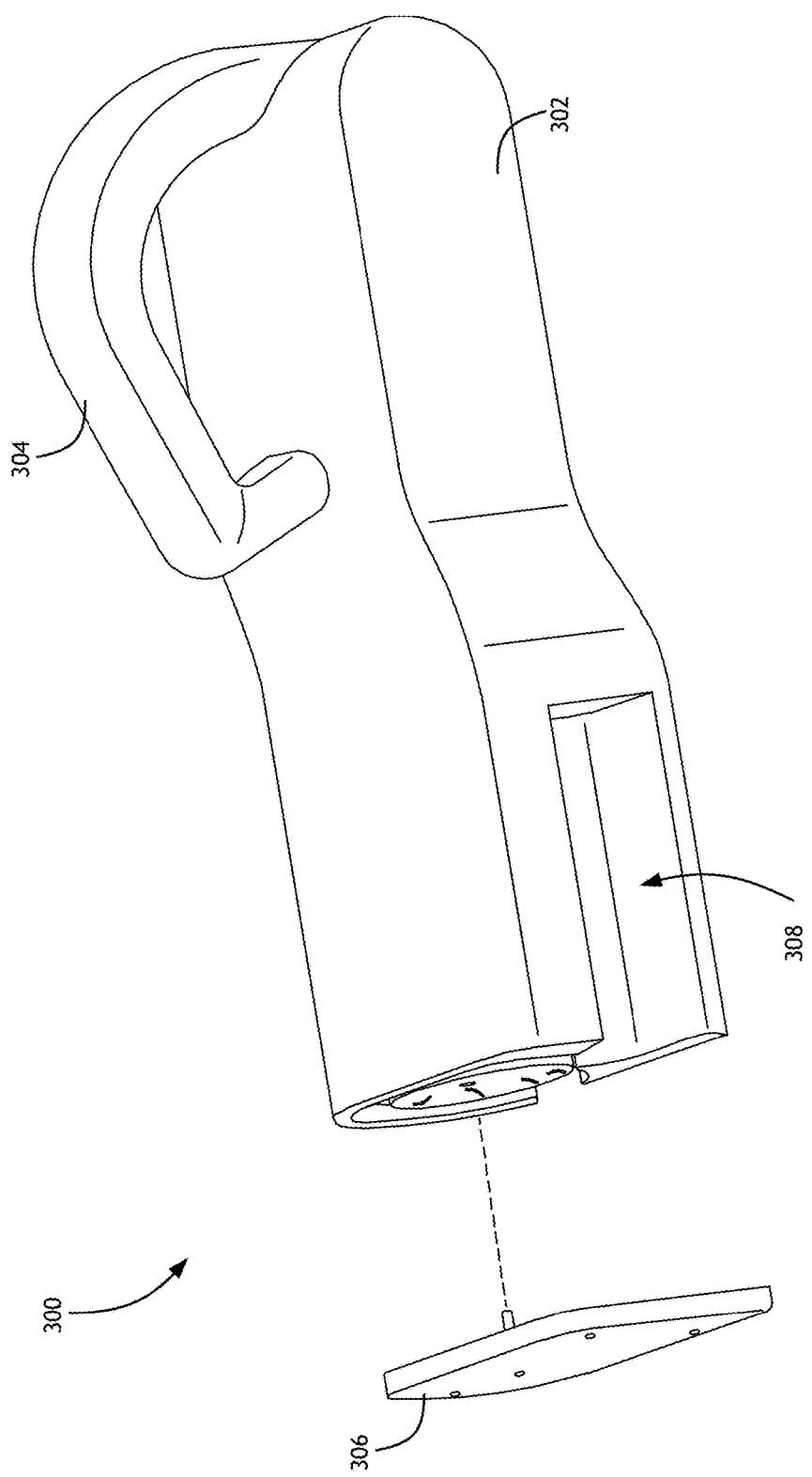
FIG. 5 shows a perspective, partially exploded view of a hand-held trimmer device according to at least one embodiment of the present invention.

Referring to FIGS. 3, 4, and 5, perspective views of a hand-held trimmer device 300 according to at least one embodiment of the present invention are shown. In at least one embodiment, the hand-held trimmer device 300 includes a housing 302 that contains a battery and motor. The housing 302 also at least partially defines a blade assembly chamber with features that work in concert with a blade assembly 400 to produce a cross-flow from an input opening 402 to an output opening 308.

The hand-held trimmer device 300 may also include a handle 304 configured to ergonomically allow a user to hold the hand-held trimmer device 300 with the input opening 402 oriented toward a surface to be trimmed, and the blade assembly 400 oriented with its axis of rotation substantially parallel to the surface to be trimmed.

In some embodiments, the hand-held trimmer device 300 may also include an access plate 306 that partially defines the blade assembly housing and allows access to the blade assembly 400. The access plate 306 may be removed or opened to periodically replace the blade assembly 400 or blades in the blade assembly 400.

Figure 6:
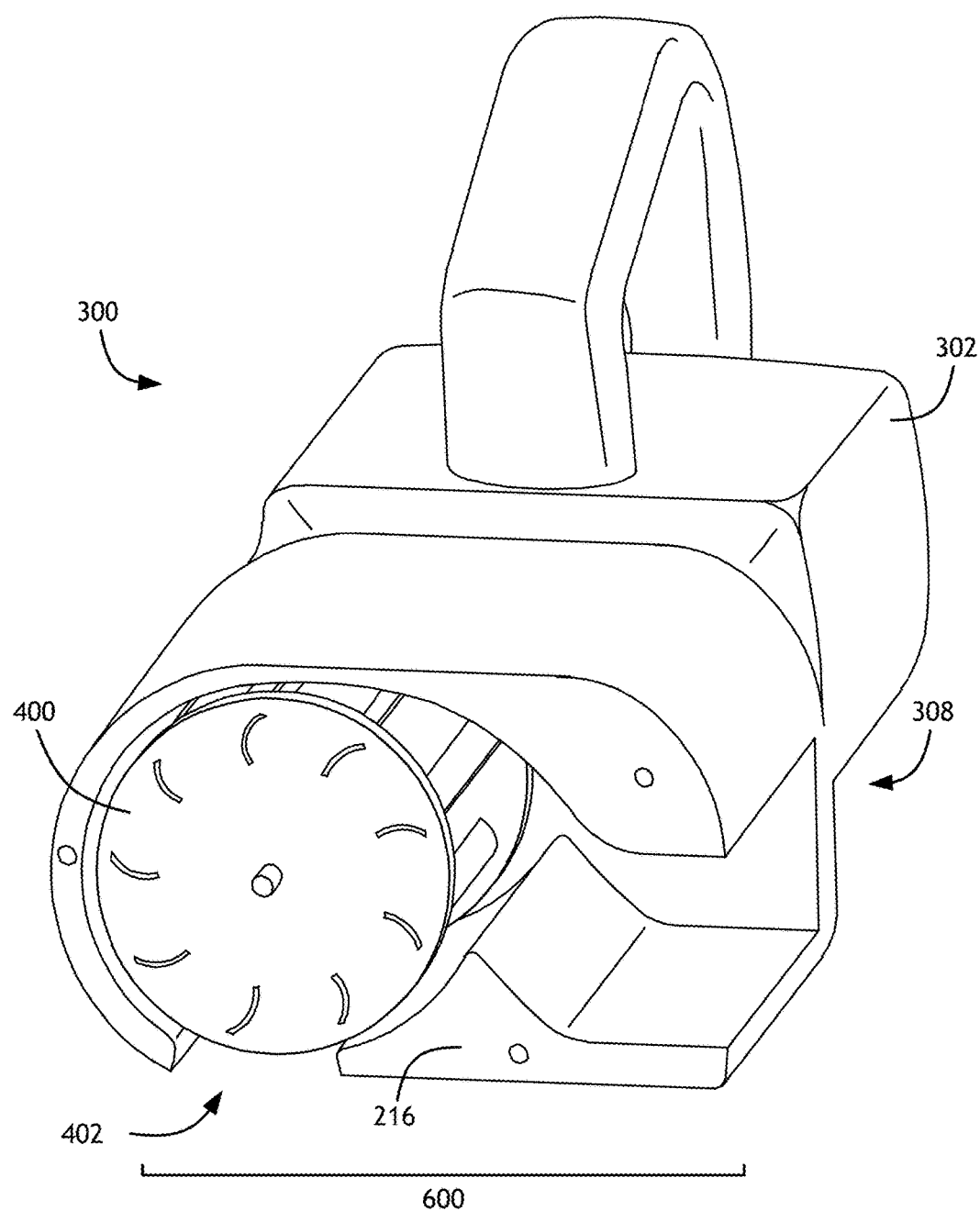
FIG. 6 shows a perspective, partially exploded view of a hand-held trimmer device according to at least one embodiment of the present invention.

Referring to FIG. 6, a perspective, partially exploded view of a hand-held trimmer device 300 according to at least one embodiment of the present invention is shown. The hand-held trimmer device 300 includes a housing 302 that defines a blade assembly chamber 600. The blade assembly chamber 600 defines an input opening 402 oriented toward a surface to be trimmed. A blade assembly 400 is oriented to trim grass leaves or other plant elements entering through the input opening 402.

The blade assembly chamber 600 constrains the blade assembly 400 and air space around the blade assembly 400 to create a cross-flow in combination with the airfoil blades of the blade assembly 402 and eject clippings from the output opening 308.

The blade assembly chamber 600 may be partially defined by a baffle 216. The baffle 216 and blade assembly chamber 600 define an airflow pathway between the input opening 402 and output opening 308 having angles useful for facilitating movement of clippings and preventing clipping adhesion to the walls of the housing 302. In at least one embodiment, the baffle 216 may include a vent as described herein.

Figure 7:
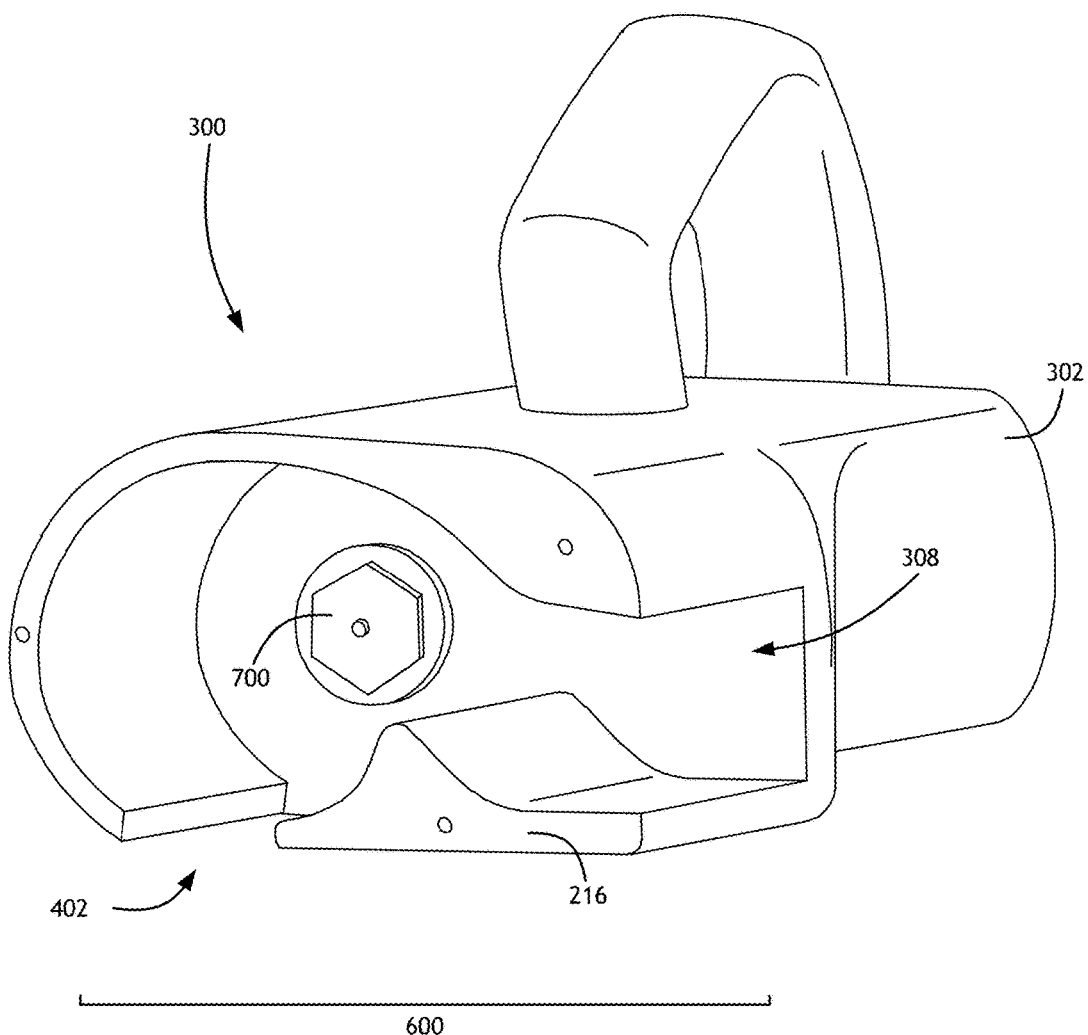
FIG. 7 shows a perspective, partially exploded view of a hand-held trimmer device without a blade assembly according to at least one embodiment of the present invention.

Referring to FIG. 7, a perspective, partially exploded view of a hand-held trimmer device 300 without a blade assembly according to at least one embodiment of the present invention is shown. In at least one embodiment, the blade assembly may be replaceable. In such embodiments, the hand-held trimmer device 300 includes a blade assemble engagement feature 700 to connect a replaceable blade assembly to a motor in the housing 302. The blade assemble engagement feature 700 may work in concert with a corresponding blade assembly bearing (not shown) which may be disposed on an access plate to maintain a desired axis of rotation when the replaceable blade assembly is installed. The blade assemble engagement feature 700 may be a male or female element, a threaded feature, or any other structure suitable for applying a rotational force to the blade assembly.

Figure 8:
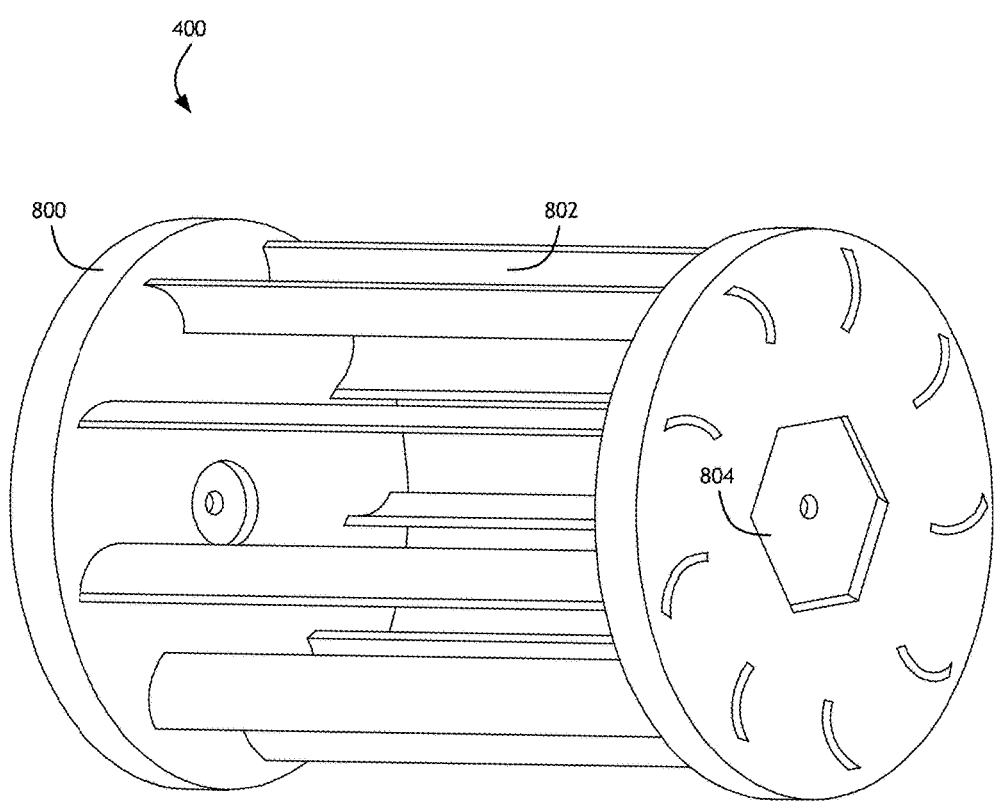
FIG. 8 shows a perspective view of a blade assembly for a hand-held trimmer device according to at least one embodiment of the present invention.

Referring to FIG. 8, a perspective view of a blade assembly 400 for a hand-held trimmer device according to at least one embodiment of the present invention is shown. In at least one embodiment, the blade assembly 400 is a replaceable component in the hand-held trimming device. The blade assembly 400 may comprise two or more rotors 800 and a plurality of blades 802 connecting the rotors 800 to define an axis of rotation. Each of the blades 802 includes a cutting edge configured to trim plants when the blade assembly 800 spins around the axis of rotation. Each blade 802 may also comprise an airfoil configured to produce a cross-flow when the blade assembly 400 spins around the axis of rotation within a blade assembly housing.

One or more of the rotors 800 may define a motor engagement feature 804. The motor engagement feature 804 works in concert with a blade assemble engagement feature in the corresponding hand-held trimming device.

In at least one embodiment, the blades 802 may be releasably affixed to each of the rotors 800. In such embodiments, the blades 802 may be replaced individually.

In at least one embodiment, a 63.5 mm diameter rotor 800 has a minimum blade length of approximately 102 mm. The rotary blade assembly 400 may be scaled to approximately 152 mm in diameter and 483 mm long. Rotors 800 approximately 305 mm in diameter may be a practical upper limit for a hand held trimming device.

Figure 9:
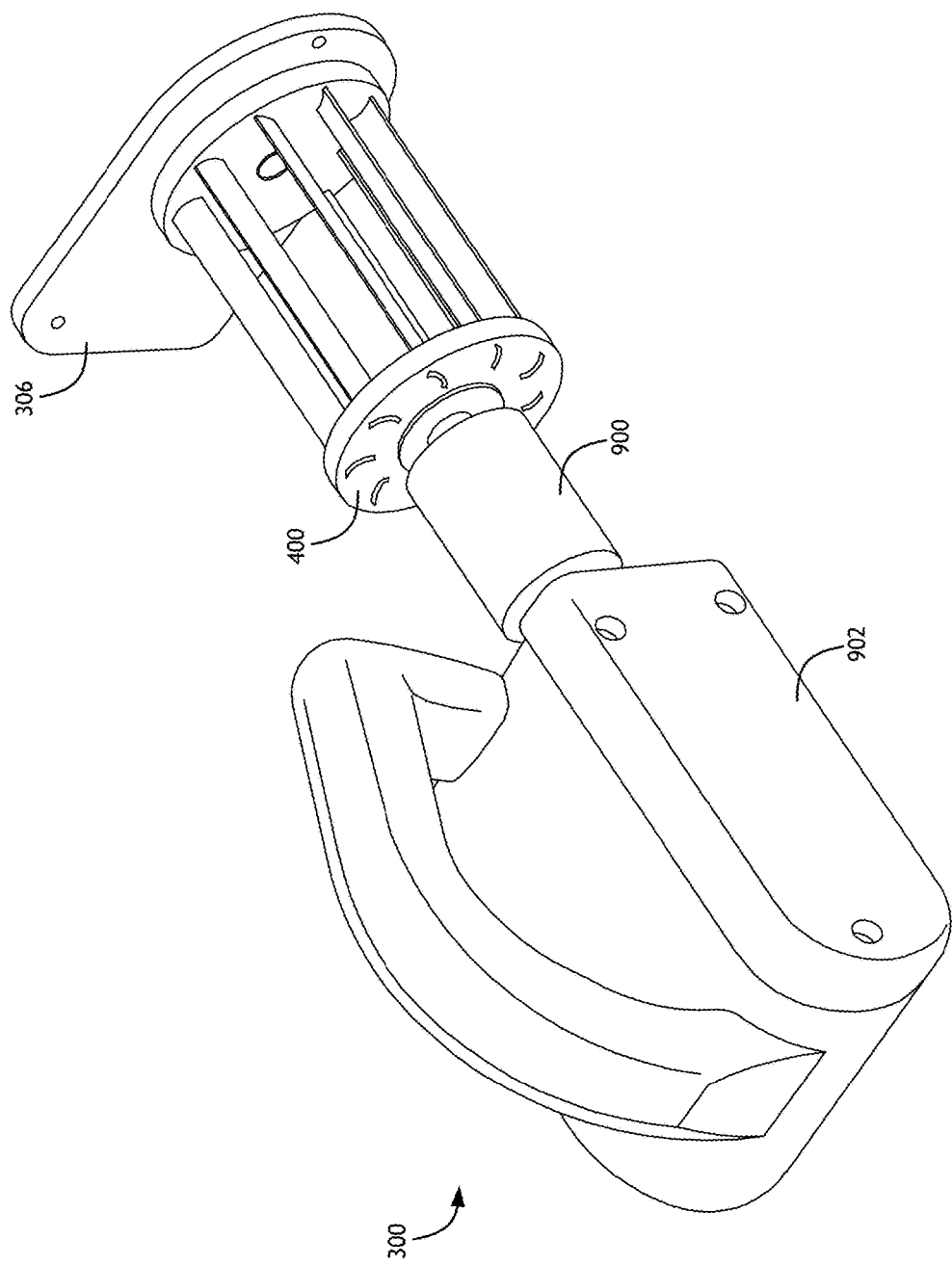
FIG. 9 shows a perspective view of a hand-held trimmer device without an air directing blade assembly housing according to at least one embodiment of the present invention.

Referring to FIG. 9, a perspective view of a hand-held trimmer device 300 without an air directing blade assembly housing according to at least one embodiment of the present invention is shown. The hand-held trimming device 300 includes a motor 900 configured to engage the blade assembly 400 and rotate the blade assembly 400 within the blade assembly housing and a battery chamber 902 to hold a rechargeable battery to drive the motor 900. In at least one embodiment, the blade assembly 400 releasably engages the motor 900 such that the blade assembly 400 may be removed by removing or otherwise opening an access plate 306 holding the blade assembly 400 in place.

Figure 10:
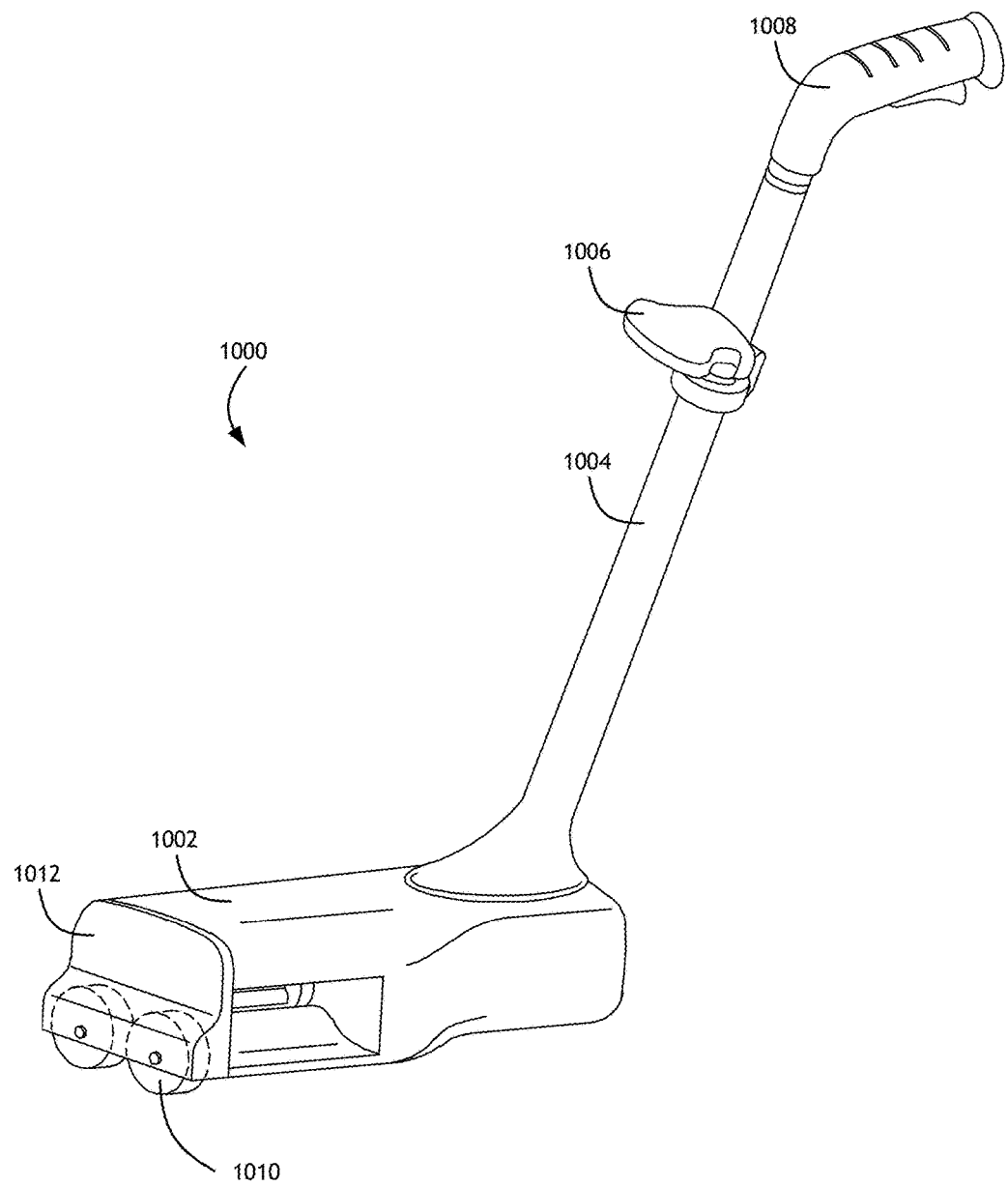
FIG. 10 shows a perspective view of a trimmer device with an extended handle according to at least one embodiment of the present invention.

Referring to FIG. 10, a perspective view of a trimmer device 1000 with an extended handle 1004 according to at least one embodiment of the present invention is shown. The trimming device 1000 includes a housing 1002 that contains a rotary blade assembly as described herein. The extended handle 1004, including one or more gripping portions 1006, 1008, allows a user to maintain the housing 1002 (and consequently the rotating blade assembly within) parallel to a surface being trimmed while in a standing position. The trimmer device 1000 may also include one or more wheels 1010 to define a distance between the rotating blade assembly and the surface to be trimmed. In some embodiments, the wheels 1010 may be adjustable to define different trim heights. The wheels 1010 may be disposed on the housing 1002 or an access plate 1012 that allows the blade assembly to be replaced.

Figure 11:
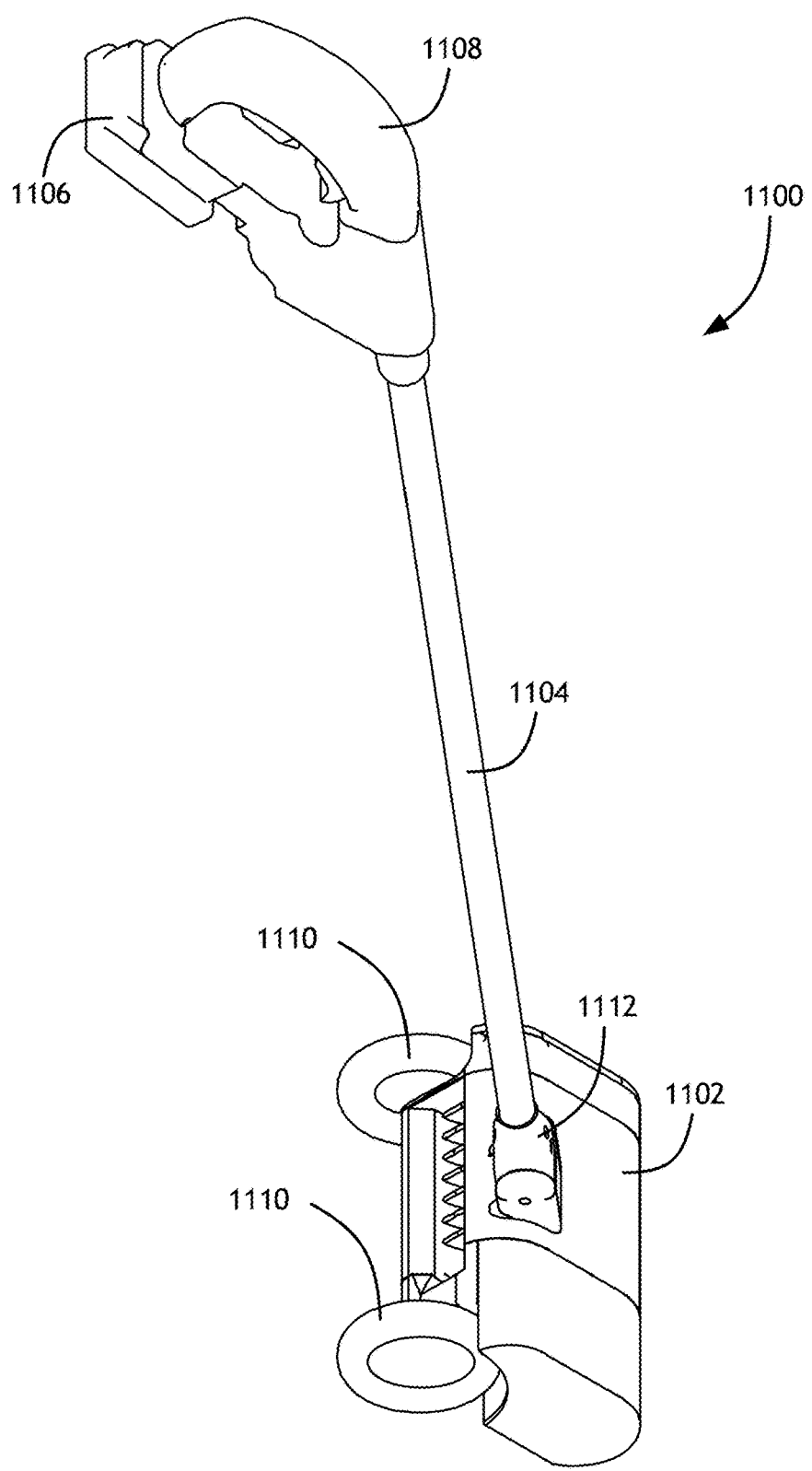
FIG. 11 shows a perspective view of a trimmer device with an extended handle according to at least one embodiment of the present invention.

Referring to FIG. 11, a perspective view of a trimmer device 1100 with an extended handle 1104 according to at least one embodiment of the present invention is shown. The trimming device 1100 includes a housing 1102 that contains a rotary blade assembly as described herein. The extended handle 1104, including a gripping portion 1108, allows a user to steer the housing 1102 (and consequently the rotating blade assembly within) along a surface being trimmed while in a standing position. In at least one embodiment, the extendable handle 1104 may be connected to the housing 1102 via a hinge element 1112. The trimmer device 1100 may also include one or more wheels 1110 to define a distance between the rotating blade assembly and the surface to be trimmed. In some embodiments, the wheels 1110 may be adjustable to define different trim heights. The wheels 1110, housing 1102, and hinge element 1112 may work in conjunction to maintain in the housing 1102 and rotary blade assembly in a desired orientation to the surface being trimmed no matter the orientation of the extendable handle 1104.

Figure 12A:
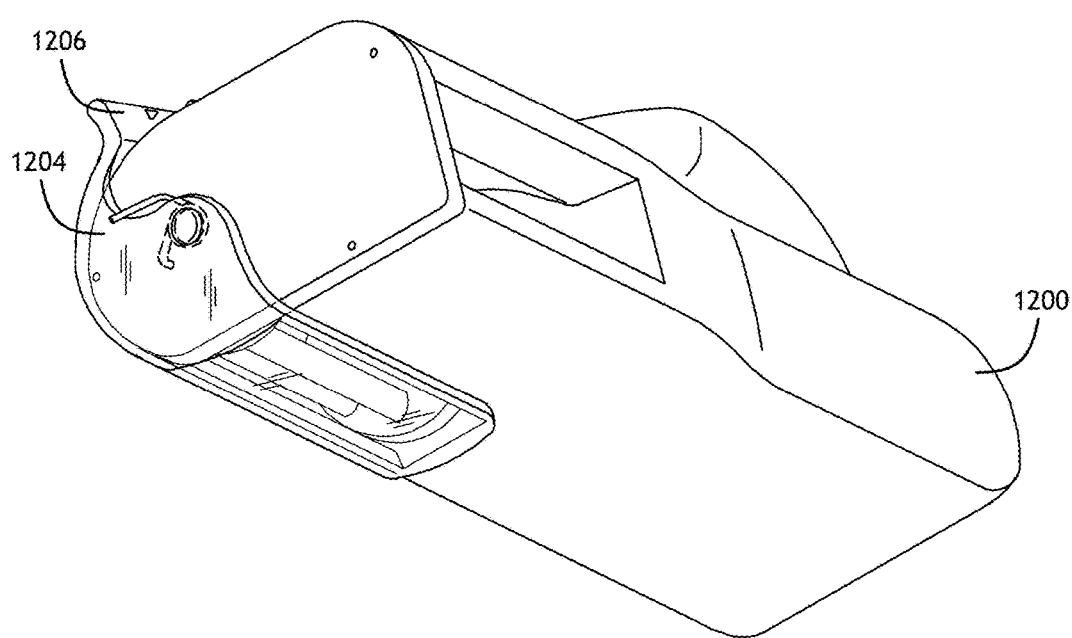
FIG. 12A shows a perspective view of a hand-held trimmer device with a blade cover according to at least one embodiment of the present invention.
Figure 12B:
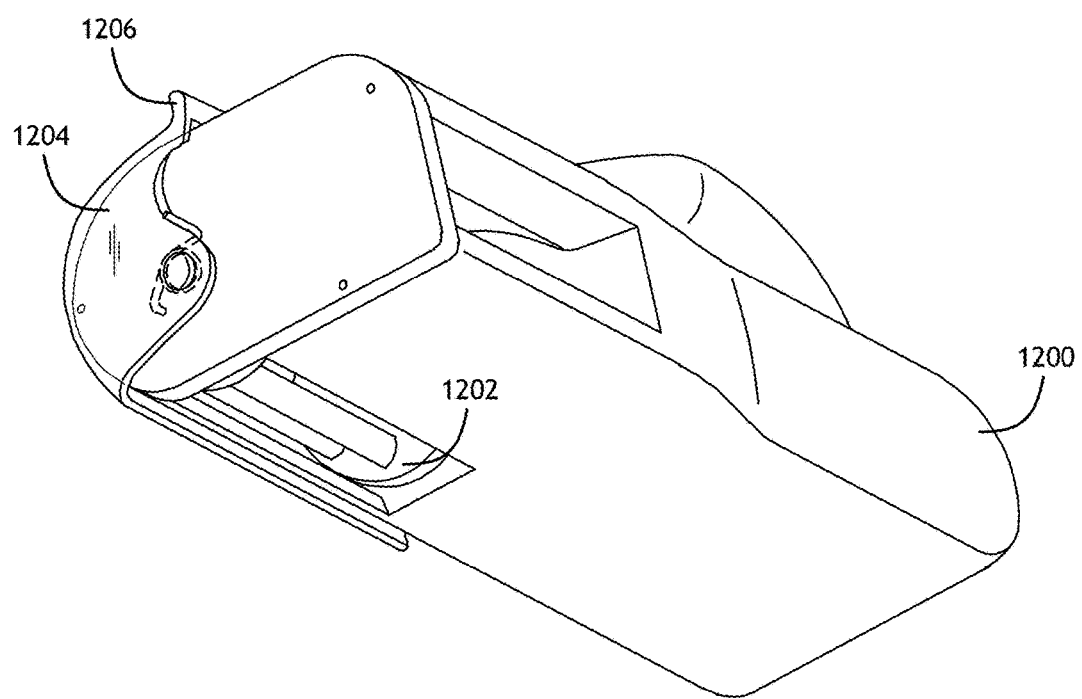
FIG. 12B shows a perspective view of a hand-held trimmer device with a blade cover according to at least one embodiment of the present invention.

Referring to FIGS. 12A and 12B, perspective views of a hand-held trimmer device with a blade cover 1204 according to at least one embodiment of the present invention are shown. In at least one embodiment, a blade cover 1204 is disposed on the housing 1200 to cover the rotating blade assembly 1202. The blade cover 1204 may be spring actuated to bias the blade cover 1204 into a closed position, requiring the operator to manually hold the blade cover 1204 in an open position during operation via a blade cover handle 1206, thereby ensuring the operator's hands are not near the unobstructed blade assembly 1202 while it is rotating.

Alternatively, the blade cover 1204 may be connected to one or more wheels such that when the wheels are depressed by contact with the surface to be trimmed, the wheels actuate the blade cover 1204 to the open position.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A rotary blade assembly housing configured to produce a cross-flow from an input opening to an output opening, the housing comprising:
   a baffle having a front surface proximal to a rotary blade assembly and a discharge baffle guide distal to the rotary blade assembly, the baffle defining a vent between the front surface and a bottom surface proximal to a surface to be cut by the rotary blade assembly,
   wherein the vent alters the cross-flow to prevent plant clippings from adhering to one or more internal surfaces of the housing.

2. The rotary blade assembly housing of claim 1, wherein the baffle further defines a recess in the bottom surface, at least a portion of the recess bounded by the vent, the recess normalizing air pressure between a region proximal to the front surface and a region proximal to the bottom surface.

3. The rotary blade assembly housing of claim 1, further comprising an access plate configured to all access to a replaceable rotary blade assembly.

4. The rotary blade assembly housing of claim 1, further comprising one or more wheels disposed on a side of the housing, the one or more wheels defining a distance of the rotary blade assembly above a surface to be trimmed.

5. A plant trimming device comprising:
   a horizontal rotary blade assembly having:
      a plurality of rotors; and
      a plurality of blades, each of the plurality of blades connected to each of the plurality of rotors, each of the plurality of blades forming an airfoil with a cutting edge;
   a blade assembly housing defining an input opening and an output opening, the housing substantially surrounding at least a portion of the horizontal rotary blade assembly, and the housing defining a path that produces a cross-flow when the horizontal rotary blade assembly rotates at an operational speed; and
   a baffle having a front surface proximal to the horizontal rotary blade assembly and a discharge baffle guide distal to the horizontal rotary blade assembly, the baffle defining a vent between the front surface and a bottom surface proximal to a surface to be cut by the rotary blade assembly, the vent altering the cross-flow to prevent plant clippings from adhering to one or more internal surfaces of the housing.

6. The plant trimming device of claim 5, further comprising a tongue foot guard disposed on the discharge baffle guide.

7. The plant trimming device of claim 5, wherein the vent alters air pressure within the cross-flow to facilitate movement of clipping to the output opening.

8. The plant trimming device of claim 5, further comprising an extended handle.

9. The plant trimming device of claim 8, further comprising one or more wheels disposed on the blade assembly housing.

10. The plant trimming device of claim 8, further comprising a blade cover connected to the blade assembly housing, the blade cover having an open position and a closed position, the closed position configured to interpose a barrier between the blade assembly and a user's hands, the open position configured to allow the blade assembly access to a surface to be trimmed via the input opening.

11. The plant trimming device of claim 5, wherein at least one rotor of the rotary blade assembly defines a motor engagement feature configured to engage a blade assembly engagement feature connected to a motor.

12. A mowing device comprising:
   a horizontal rotary blade assembly having:
      a plurality of rotors; and
      a plurality of blades, each of the plurality of blades connected to each of the plurality of rotors, each of the plurality of blades forming an airfoil with a cutting edge;
   a mower housing defining an input opening and an output opening, the housing substantially surrounding at least a portion of the horizontal rotary blade assembly, and the housing defining a path configured to produce a cross-flow when the horizontal rotary blade assembly rotates at an operational speed; and
   a baffle having a front surface proximal to the horizontal rotary blade assembly and a discharge baffle guide distal to the horizontal rotary blade assembly, dividing the input opening and output opening, the baffle defining a vent between the front surface and a bottom surface proximal to a surface to be cut by the rotary blade assembly, the vent altering the cross-flow to prevent plant clippings from adhering to one or more internal surfaces of the housing.

13. The mowing device of claim 12, wherein the vent alters air pressure within the cross-flow to facilitate movement of clipping to the output opening.

14. The mowing device of claim 12, further comprising an extended handle disposed on the mower housing.

15. The mowing device of claim 14, further comprising one or more wheels disposed on the mower housing.

16. The mowing device of claim 14, further comprising a blade cover connected to the mower housing, the blade cover having an open position and a closed position, the closed position configured to interpose a barrier between the blade assembly and a user's hands, the open position configured to allow the blade assembly access to a surface to be trimmed via the input opening.

* * * * *